United States Patent

Pawlak, III et al.

(10) Patent No.: US 6,712,280 B2
(45) Date of Patent: Mar. 30, 2004

(54) DEEP MASS COMPENSATION FOR A VEHICLE AUTOMATIC CLIMATE CONTROL

(75) Inventors: John Lawrence Pawlak, III, Orchard Park, NY (US); Mingyu Wang, Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/342,926

(22) Filed: Jan. 15, 2003

(65) Prior Publication Data

US 2004/0016817 A1 Jan. 29, 2004

Related U.S. Application Data

(60) Provisional application No. 60/398,408, filed on Jul. 25, 2002.

(51) Int. Cl.$^7$ ................................................ F24F 7/00
(52) U.S. Cl. ...................... 236/49.3; 236/91 C; 62/244; 165/202
(58) Field of Search ............................ 236/49.3, 91 C; 62/178, 244; 165/202, 42

(56) References Cited

U.S. PATENT DOCUMENTS

| 5,603,226 A | 2/1997 | Ishikawa et al. ............... 62/182 |
| 6,079,485 A | * 6/2000 | Esaki et al. .................... 165/43 |
| 6,234,398 B1 | 5/2001 | Pawlak, III et al. ...... 236/91 C |

* cited by examiner

*Primary Examiner*—Marc Norman
(74) *Attorney, Agent, or Firm*—Patrick M. Griffin

(57) ABSTRACT

A motor vehicle automatic climate control determines the heating or cooling influence of the deep mass components of the cabin and compensates the climate control to offset the thermal effects of the deep mass components on the cabin air temperature. The deep mass temperature is either measured or estimated by modeling, and combined with an estimate of the thermal resistance between the deep mass components and the cabin air to determine the heating or cooling power required to offset the deep mass temperature. The heating or cooling power so determined is used by a climate control algorithm to adjust the system air discharge velocity and temperature, directly compensating for the deep mass temperature effects.

8 Claims, 2 Drawing Sheets

DEEP MASS COMPENSATION FOR A VEHICLE AUTOMATIC CLIMATE CONTROL

PRIOR APPLICATION

This application claims the benefit of prior Provisional Patent Application Serial No. 60/398,408 filed Jul. 25, 2002.

TECHNICAL FIELD

This invention relates to an automatic climate control for a vehicle heating, ventilation and air-conditioning (HVAC) system, and more particularly to a method of compensating the control for heating and cooling effects associated with the interior components of the vehicle cabin.

BACKGROUND OF THE INVENTION

In general, an automatic climate control system regulates the discharge air velocity, temperature and location based on a desired or set temperature and a number of easily measured or estimated parameters such as the outside air temperature, the cabin air temperature, and the solar intensity. In some cases, the parameters are arithmetically combined to form a numerical index or program number from which the discharge air velocity and temperature are determined by table look-up. In other cases, the parameters are used to solve a work or power balance equation for the required heating or cooling effort, and a control algorithm selects one of several possible combinations of discharge air velocity and temperature for satisfying the required effort.

However, the thermal effects associated with the interior components of the vehicle cabin (referred to herein as the deep mass or core components) are typically ignored, particularly in systems that measure the cabin air temperature since the temperature of the deep mass components will eventually be reflected in the measured cabin air temperature. For example, the deep mass components following a heat soak condition will continue to elevate the measured cabin air temperature well after the effects of outside air temperature and solar intensity have been addressed. This indirect method of addressing deep mass temperature effects is obviously reactive in nature, and tends to degrade the cabin air temperature regulation. In systems that do attempt to address deep mass temperature effects, such as the U.S. Pat. No. 5,603,226 to Ishikawa et al., only marginal improvement is achieved because the temperature of the deep mass components is not known. For example, Ishikawa et al. assume that the temperature of the cabin components is equivalent to the temperature of the cabin air, which in actuality is only true after the entire cabin has reached a steady-state temperature. Accordingly, what is needed is an automatic climate control method that directly and accurately accounts for deep mass temperature effects.

SUMMARY OF THE INVENTION

The present invention is directed to an improved motor vehicle automatic climate control method in which the heating or cooling influence of the deep mass components of the cabin is accurately determined and used to compensate the climate control for offsetting the thermal effects of the deep mass components on the cabin air temperature. The deep mass temperature is either measured or estimated by modeling, and combined with a measure of the thermal resistance between the deep mass components and the cabin air to determine the heating or cooling power required to offset the deep mass temperature. The heating or cooling power so determined is used by a climate control algorithm to adjust the system air discharge velocity and temperature, directly compensating for the deep mass temperature effects.

DESCRIPTION OF THE PREFERRED EMBODIMENT

Figure 1:
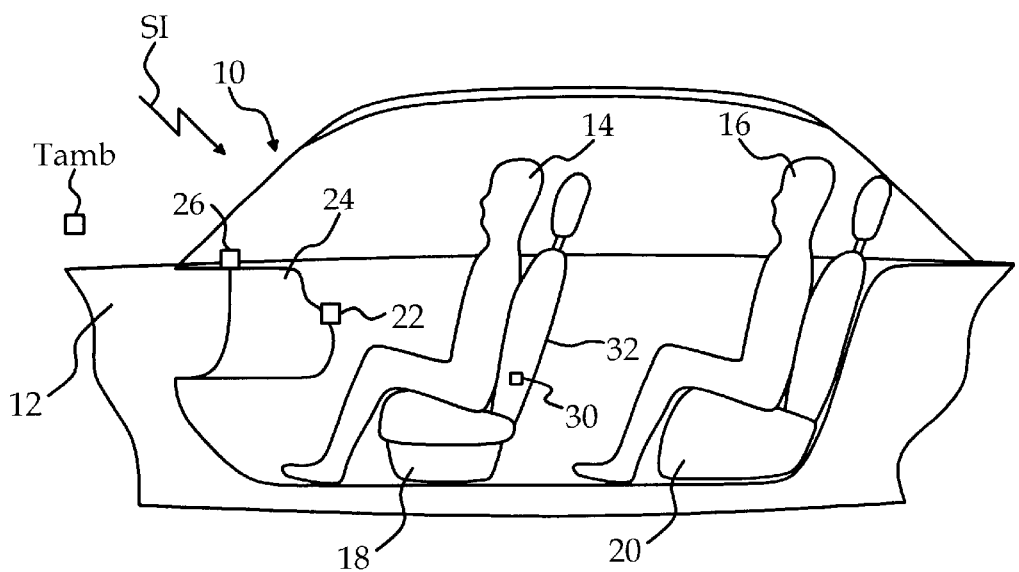
FIG. 1 depicts the cabin of a motor vehicle, and the measured or estimated temperature locations according to this invention.

Referring to FIG. 1, the reference numeral 10 generally designates the passenger compartment or cabin of a motor vehicle 12, in which occupants 14, 16 are seated in front and rear seats 18, 20. The temperature of the air in cabin 10, referred to herein as $T_{cabin}$, is typically measured at a convenient location such as in the region 22 of instrument panel 24, although $T_{cabin}$ may alternatively be estimated, as disclosed for example in the U.S. Pat. No. 6,234,398, assigned to Delphi Technologies, Inc. In general, $T_{cabin}$ is influenced by three primary factors: the temperature $T_{amb}$ of the ambient or atmospheric air, the solar intensity (SI), and the temperature $T_{deep}$ of the deep mass components of the cabin 10. Other factors, such as the heat produced by the occupants 14, 16 and the heat transferred to the cabin 10 by the vehicle engine and exhaust system, are typically negligible and can be ignored. The ambient temperature $T_{amb}$ is easily measured with a suitably placed thermistor, and the solar intensity SI may be measured by one or more suitably placed sensors 26, as is well known in the art. The deep mass components include the seats 18, 20, the instrument panel 24, the cabin doors, carpeting and floor, etc., and according to this invention, $T_{deep}$ may be either measured or estimated by thermal modeling. In applications where $T_{deep}$ is to be measured, it has been found that accurate and reliable measurements are obtained with a thermistor 30 located on the seat back frame 32 of front seat 18 as shown in FIG. 1. In locating thermistor 30, it is particularly important that it not be directly exposed to convective air currents generated by the HVAC system or be placed in direct contact with the outer skin of the cabin 10. If desired, $T_{deep}$ may be measured by a plurality of thermistors located in various deep mass regions of the cabin 10, but the number of sensors should be minimized for cost purposes. Of course, estimation of $T_{deep}$ is the lowest cost implementation, and a suitable thermal modeling technique is described below in reference to FIGS. 3 and 4.

Figure 2:
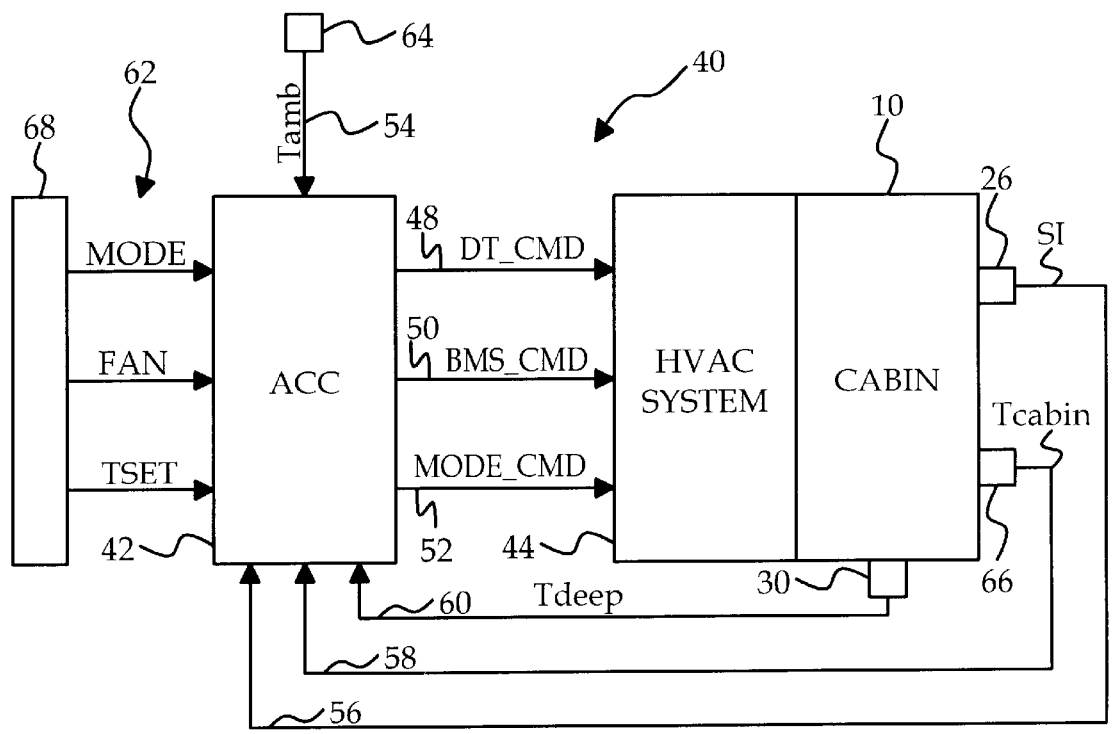
FIG. 2 is a diagram of an automatic climate control system according to this invention, including an electronic automatic climate controller.

Referring to FIG. 2, the reference numeral 40 generally designates an automatic climate control system of vehicle 12 for regulating the cabin air temperature based in part on a measure of the deep mass temperature $T_{deep}$. The system includes a microprocessor-based automatic climate controller (ACC) 42, and a heating, ventilation and air-conditioning (HVAC) system 44 adapted to deliver conditioned air to the cabin 10. The controller 42 is responsive to various inputs for developing and outputting a set of climate control commands for the discharge temperature (DT_CMD), blower motor speed (BMS_CMD), and air discharge mode (MODE_CMD) on lines 48, 50 and 52. The inputs include ambient temperature $T_{amb}$ on line 54, solar intensity SI on line 56, cabin temperature $T_{cabin}$ on line 58, deep mass temperature $T_{deep}$ on line 60, and a number of occupant-generated inputs as generally designated by the reference numeral 62. Sensors 64, 66, 30, 26 for developing the inputs $T_{amb}$, $T_{cabin}$, $T_{deep}$ and SI may be purely conventional. The occupant-generated inputs 62 are generated by an operator interface panel 68 located in instrument panel 24, and include a set temperature (TSET), and either automatic or manual overrides for the blower speed (FAN) and the air discharge mode (MODE).

The HVAC system 44 includes various elements of a conventional automotive HVAC system, and responds to the commands on lines 48, 50, 52 in a conventional fashion. For example, HVAC system 44 includes a refrigerant compressor which may be driven by the vehicle engine and a heater core which may be coupled to the engine coolant. A control mechanism is employed for regulating the heater core coolant flow and/or the compressor capacity and/or mix control doors to satisfy the discharge temperature command (DT_CMD) on line 48. The air discharged into cabin 10 is generated by a blower driven by a blower motor, and a control circuit drives the blower motor to satisfy the blower motor speed command (BMS_CMD) on line 50. A set of mode control doors and a control mechanism for positioning the mode control doors is employed to satisfy the mode command (MODE_CMD) on line 52.

As indicted above, ACC 42 executes a climate control algorithm to produce the climate control commands DT_CMD, BMS_CMD, MODE_CMD. In one approach, generally described in the above-mentioned U.S. Pat. No. 6,234,398 to Pawlak et al., the inputs $T_{amb}$, $T_{cabin}$ and SI and the occupant set temperature TSET are arithmetically combined to form a numerical index or program number from which DT_CMD, BMS_CMD and MODE_CMD are determined by table look-up. In another approach, generally described in the above-mentioned U.S. Pat. No. 5,603,226 to Ishikawa et al., the inputs $T_{amb}$, $T_{cabin}$ and SI are used to solve a work or power balance equation for the required heating or cooling effort, and ACC 42 selects one of several possible combinations of DT_CMD and BMS_CMD for satisfying the required effort. In either case, the deep mass temperature $T_{deep}$ (whether measured or estimated by thermal modeling) may be converted to a corresponding heating or cooling requirement PWR_DEEP (as described below in reference to FIGS. 3–4) and utilized to modify the customary climate control algorithm to directly compensate for the deep mass thermal effects on the cabin air temperature. In the numerical index or program number approach, PWR_DEEP may be suitably scaled and combined with the other inputs so that PWR_DEEP directly affects the numerical index or program number, and therefore the commands DT_CMD, BMS_CMD and MODE_CMD. Alternatively, PWR_DEEP could be used to generate discharge temperature and blower speed offsets, which ACC 42 would apply to the commands DT_CMD and BMS_CMD. Obviously, there are other possibilities as well. In the power balance approach, PWR_DEEP may be algebraically combined with the ambient and solar terms as suggested in the above-mentioned U.S. Pat. No. 5,603,226 to Ishikawa et al.

Figure 3:
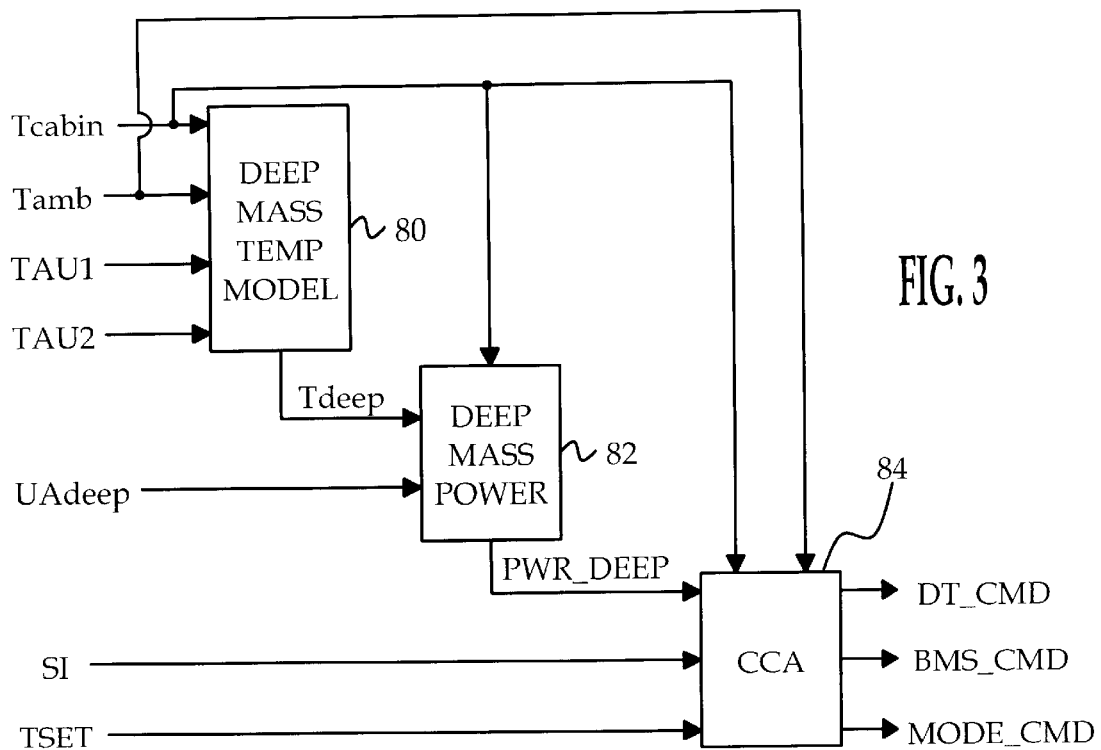
FIG. 3 is a block diagram of a control carried out by the automatic climate controller of FIG. 2 according to this invention.
Figure 4:
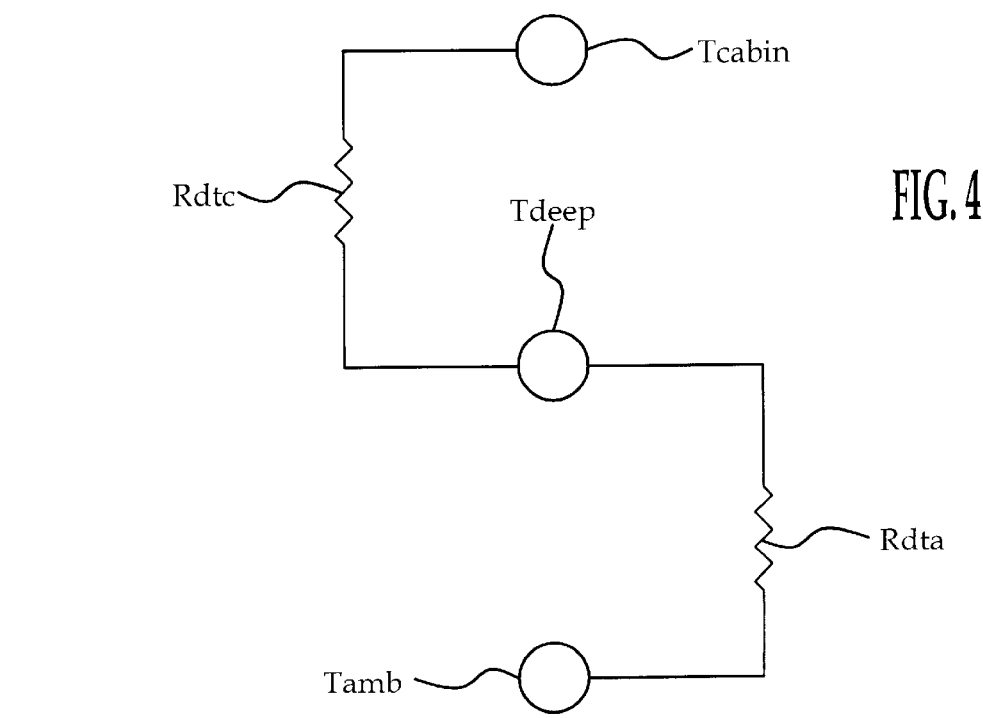
FIG. 4 depicts a lumped parameter model of the motor vehicle cabin of FIG. 1 according to this invention.

FIG. 3 is a block diagram of ACC 42 for an implementation in which $T_{deep}$ is estimated by thermal modeling. In implementations where $T_{deep}$ is measured, the thermal model block 80 may simply be considered as the temperature sensor 30. As indicated at block 80, $T_{deep}$ may be modeled as a function of $T_{cabin}$, $T_{amb}$ and empirically determined thermal time constants TAU1, TAU2. The model may be a lumped parameter model, as shown diagrammatically in FIG. 4, where the model nodes include $T_{cabin}$, $T_{deep}$ and $T_{amb}$. The nodes $T_{cabin}$ and $T_{deep}$ are coupled by a deep-to-cabin thermal resistance $R_{dtc}$, and the nodes $T_{deep}$ and $T_{amb}$ are coupled by a deep-to-ambient thermal resistance $R_{dta}$. Radiation heat transfer between the nodes is neglected, and the thermal resistances $R_{dta}$ and $R_{dtc}$ are considered to be constant within the operating range of the vehicle. The time rate of change in $T_{deep}$ (i.e., $T_{deep}$_DOT) is given by the heat balance equation:

$$T_{deep\_}DOT=[1/(m_{deep}*C_{Pdeep})]*[(T_{amb}-T_{deep})/(R_{dta})]+[(T_{cabin}-T_{deep})/(R_{dtc})]$$

where $m_{deep}$ and $C_{Pdeep}$ are the mass and specific heat, respectively, of the deep mass components. The terms $m_{deep}$, $C_{Pdeep}$, $R_{dta}$, and $R_{dtc}$ are constants, and may be combined to form the time constants TAU1 and TAU2 as follows:

$$TAU1=m_{deep}*C_{Pdeep}*R_{dta}, \text{ and}$$

$$TAU2=m_{deep}*C_{Pdeep}*R_{dtc}$$

so that $T_{deep}$_DOT can be expressed as simply:

$$T_{deep\_}DOT=[(T_{amb}-T_{deep})/TAU1]+[(T_{cabin}-T_{deep})/TAU2] \quad (1)$$

The controller 42 numerically integrates equation (1) for $T_{deep}$ using a finite difference technique, as follows:

$$T_{deep,\ j}=T_{deep,\ j-1}+[(T_{amb}-T_{deep})/TAU1](DT)+[(T_{cabin}-T_{deep})/TAU2](DT) \quad (2)$$

where $T_{deep,\ j}$ and $T_{deep,\ j-1}$ are the current and previous values, respectively, of $T_{deep}$, and DT is the integration time step. The term $T_{deep}$ is initialized at the vehicle assembly when the temperatures of the deep mass components and the cabin air are both equal to the temperature of the assembly plant. Once the vehicle is in use and $T_{deep}$ needs to be re-initialized (due to battery power interruption, for example), the controller 42 can set $T_{deep}$ equal to $T_{cabin}$ so long as the solar intensity SI is low. Alternatively, or if SI is not low, $T_{deep}$ may be initialized to the average of $T_{cabin}$ and $T_{amb}$. In either case, the term $T_{deep}$ will converge to the correct value over a few driving cycles.

The time constants TAU1 and TAU2 are determined experimentally for any type of vehicle by measuring an average temperature of the deep mass components (in addition to the usual temperature measurements), placing the vehicle in a hot or cold environmental chamber, and monitoring the changes in the measured temperatures. The time constants TAU1 and TAU2 may be determined using signal processing software such as Excel Solver (developed and distributed by Microsoft Inc.), to determine what values of TAU1 and TAU2 will satisfy equation (2) for the collected temperature data.

The block 82 combines $T_{deep}$ with $T_{cabin}$ with a thermal transfer parameter (conductance $UA_{deep}$) characterizing heat transfer between the deep mass components and the cabin air to form the output PWR_DEEP. Functionally PWR_DEEP represents the heating or cooling power that the automatic climate control system 40 must supply to offset the effect of the deep mass temperature $T_{deep}$ on the cabin 10 and occupants 14, 16. The power PRW_DEEP is given according to:

$$PWR\_DEEP=UA_{deep}(T_{cabin}-T_{deep}) \quad (3)$$

and the lumped thermal conductance $UA_{deep}$ must be empirically determined for a given type of vehicle. The thermal conductance $UA_{deep}$ can be determined once the cabin air temperature has stabilized at the set temperature TSET by measuring the total HVAC power (PWR_TOTAL) supplied to the cabin 10 during comfortable operation, subtracting from PWR_TOTAL the power components PWR_AMB and PWR_SOLAR required to offset the effects of ambient temperature and solar intensity, respectively, and accounting for deep mass temperature change. Specifically, the thermal conductance $UA_{deep}$ is given by:

$$UA_{deep}=(PWR\_TOTAL-PWR\_AMB-PWR\_SOLAR)/(T_{cabin}-T_{deep}) \quad (4)$$

The numerator of equation (4) represents the power required to offset the effects of the deep mass temperature $T_{deep}$, and the denominator is simply the temperature differential between the cabin 10 and the deep mass components.

Finally, the block 84 simply represents the climate control algorithm (CCA) executed by ACC 42, as described above in reference to FIG. 2. Thus, the block 84 is responsive to PWR_DEEP, $T_{cabin}$, $T_{amb}$, SI and TSET, and develops the commands DT_CMD, BMS_CMD and MODE_CMD for the air discharge temperature, the blower speed and the air discharge mode. As explained in reference to FIG. 2, there are various ways to utilize PWR_DEEP depending on the climate control algorithm methodology, and it will be recognized that the present invention is not intended to be limited to a particular approach.

In summary, the present invention provides a method of determining the heating or cooling power required to offset the effects of the temperature $T_{deep}$ of the deep mass components of a motor vehicle 12. The climate control algorithm executed by ACC 42 utilizes the determined power requirement in selecting the HVAC control parameters to directly compensate for the thermal effects of the deep mass components, thereby contributing to improved cabin temperature regulation. While described in reference to the illustrated embodiments, it is expected that various modifications in addition to those suggested above will occur to those skilled in the art. For example, a high-order, multi-node cabin model capable of predicting the temperature of various cabin panels and zones could be used to estimate $T_{deep}$ based on a weighted average, and so on. Accordingly, it should be understood that the scope of this invention is not limited to the illustrated embodiment, and that controls incorporating such modifications may fall within the intended breadth of the appended claims.

What is claimed is:

1. A method of operation for an automatic climate controller that develops HVAC climate control commands for regulating an air temperature in a cabin of a motor vehicle, comprising the steps of:
   measuring or estimating a temperature of deep mass components of said cabin and a temperature of the air in said cabin;
   determining a thermal transfer parameter characterizing heat transfer between said deep mass components and the air in said cabin;
   determining a heating or cooling power to be supplied to said cabin for offsetting heat transfer between said deep mass components and the air in said cabin, based on said thermal transfer parameter and the temperatures of said deep mass components and said cabin air; and
   adjusting said HVAC climate control commands according to the determined heating or cooling power to compensate the regulation of said cabin air temperature for heat transfer between said deep mass components and the air in said cabin.

2. The method of operation of claim 1, including the step of:
   measuring the temperature of said deep mass components by measuring a temperature of a seat frame of said cabin.

3. The method of operation of claim 1, including the step of:
   estimating the deep mass temperature by establishing an initial value of said deep mass temperature, and then updating said deep mass temperature based on a deviation of said deep mass temperature from an ambient air temperature and a deviation of said deep mass temperature from the cabin air temperature.

4. The method of operation of claim 3, wherein the deep mass temperature $T_{deep}$ is estimated according to:

$$T_{deep,\ j}=T_{deep,\ j-1}+[(T_{amb}-T_{deep})/TAU1](DT)+[(T_{cabin}-T_{deep})/TAU2](DT)$$

where $T_{deep,\ j}$ and $T_{deep,\ j-1}$ are current and previous values, respectively, of said deep mass temperature, $T_{amb}$ is the ambient air temperature, $T_{cabin}$ is the cabin air temperature, TAU1 is a time constant characterizing thermal heat transfer between the deep mass components and the ambient air, TAU2 is a time constant characterizing thermal heat transfer between the deep mass components and the cabin air, and DT is an integration time step.

5. The method of operation of claim 4, wherein TAU1 and TAU2 are determined by measuring the cabin air temperature ($T_{cabin}$) and a change in temperature ($T_{deep}$_DOT) of said deep mass components as the vehicle is subjected to a known ambient air temperature $T_{amb}$, and determining what values of TAU1 and TAU2 will satisfy:

$$T_{deep}\_DOT=[(T_{amb}-T_{deep})/TAU1]+[(T_{cabin}-T_{deep})/TAU2]$$

for the measured cabin air temperature and the measured change in temperature of said deep mass components.

6. The method of operation of claim 1, including the steps of:
   measuring the cabin air temperature ($T_{cabin}$) and a temperature ($T_{deep}$) of said deep mass components;
   determining an HVAC power supplied to said cabin to offset heat transfer between said deep mass components and said cabin air; and
   determining said thermal transfer parameter by based on the determined HVAC power and a difference between $T_{cabin}$ and $T_{deep}$.

7. The method of operation of claim 6, wherein the HVAC power supplied to said cabin to offset heat transfer between said deep mass components and said cabin air is determined by determining a total HVAC power required to regulate the cabin air temperature, determining a first HVAC power component required to offset heating of said cabin air by said ambient air, determining a second HVAC power component required to offset heating of said cabin air by solar effects; and reducing said total HVAC power by said first and second HVAC power components.

8. The method of operation of claim 1, where at least one seat is disposed in the cabin, and the method includes the steps of:
   locating a temperature responsive sensor on a frame of said seat; and
   utilizing an output of said sensor as a measure of the temperature of the deep mass components.

* * * * *